US010780976B2

(12) United States Patent
De Wergifosse et al.

(10) Patent No.: US 10,780,976 B2
(45) Date of Patent: Sep. 22, 2020

(54) SIMPLIFIED PITCH ACTUATION SYSTEM FOR A TURBOMACHINE PROPELLER

(71) Applicant: SAFRAN AIRCRAFT ENGINES, Paris (FR)

(72) Inventors: Huguette De Wergifosse, Moissy-Cramayel (FR); Frédéric Brettes, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 8 days.

(21) Appl. No.: 16/094,623

(22) PCT Filed: Apr. 18, 2017

(86) PCT No.: PCT/FR2017/050911
§ 371 (c)(1),
(2) Date: Oct. 18, 2018

(87) PCT Pub. No.: WO2017/182748
PCT Pub. Date: Oct. 26, 2017

(65) Prior Publication Data
US 2019/0106198 A1 Apr. 11, 2019

(30) Foreign Application Priority Data
Apr. 20, 2016 (FR) ...................... 16 53469

(51) Int. Cl.
*B64C 11/44* (2006.01)
*F01D 7/00* (2006.01)
*F02C 6/20* (2006.01)

(52) U.S. Cl.
CPC ............... *B64C 11/44* (2013.01); *F01D 7/00* (2013.01); *F02C 6/206* (2013.01);
(Continued)

(58) Field of Classification Search
CPC . B64C 11/44; F02C 6/206; F01D 7/00; F01D 7/02; F05D 2260/75;
(Continued)

(56) References Cited

U.S. PATENT DOCUMENTS 2,370,135 A * 2/1945 Berliner .................. B64C 11/44
416/152
2,548,045 A * 4/1951 Nichols .................... B63H 3/04
416/155
(Continued)

FOREIGN PATENT DOCUMENTS

BE 874455 A 6/1979
GB 2174762 A 11/1986

OTHER PUBLICATIONS

International Search Report dated Jul. 21, 2017, issued in corresponding International Application No. PCT/FR2017/050911, filed Apr. 18, 2017, 3 pages.
(Continued)

*Primary Examiner* — Christopher Verdier
(74) *Attorney, Agent, or Firm* — Christensen O'Connor Johnson Kindness, PLLC

(57) ABSTRACT

A pitch actuating system for a turbomachine propeller including an actuator having a movable portion configured to be connected to propeller blades for displacement thereof in rotation with respect to the pitch axes of the blades. A first pitch control system for the blades, includes a first transmission screw movable in rotation, a first nut traversed by the first transmission screw and configured to cooperate with the blades for their displacement, an auxiliary system for feathering the blades, which comprise a second fixed transmission screw, a second nut traversed by the second transmission screw and movable in translation on the second nut, and wherein the pitch actuation system is configured so that
(Continued)

a translational movement of the second nut causes a translational movement of the first transmission screw.

10 Claims, 3 Drawing Sheets

(52) U.S. Cl.
CPC .................. *F05D 2220/324* (2013.01); *F05D 2260/40311* (2013.01); *F05D 2260/74* (2013.01); *F05D 2260/75* (2013.01); *F05D 2260/79* (2013.01); *F05D 2270/09* (2013.01); *F05D 2270/62* (2013.01)

(58) Field of Classification Search
CPC ............. F05D 2260/79; F05D 2260/74; F05D 2270/62; F05D 2220/324; F05D 2260/40311; F05D 2270/09
See application file for complete search history.

(56) References Cited

U.S. PATENT DOCUMENTS

| | | |
|---|---|---|
| 4,591,313 A | 5/1986 | Miyatake et al. |
| 4,688,995 A | 8/1987 | Wright et al. |
| 8,167,553 B2 * | 5/2012 | Perkinson ............... B64C 11/36 416/1 |
| 2004/0042897 A1 | 3/2004 | Pietricola |
| 2011/0014046 A1 | 1/2011 | Gallet |

OTHER PUBLICATIONS

Written Opinion of the International Searching Authority dated Jul. 21, 2017, issued in corresponding International Application No. PCT/FR2017/050911, filed Apr. 18, 2017, 6 pages.

International Preliminary Report on Patentability dated Oct. 23, 2018, issued in corresponding International Application No. PCT/FR2017/050911, filed Apr. 18, 2017, 1 page.

* cited by examiner

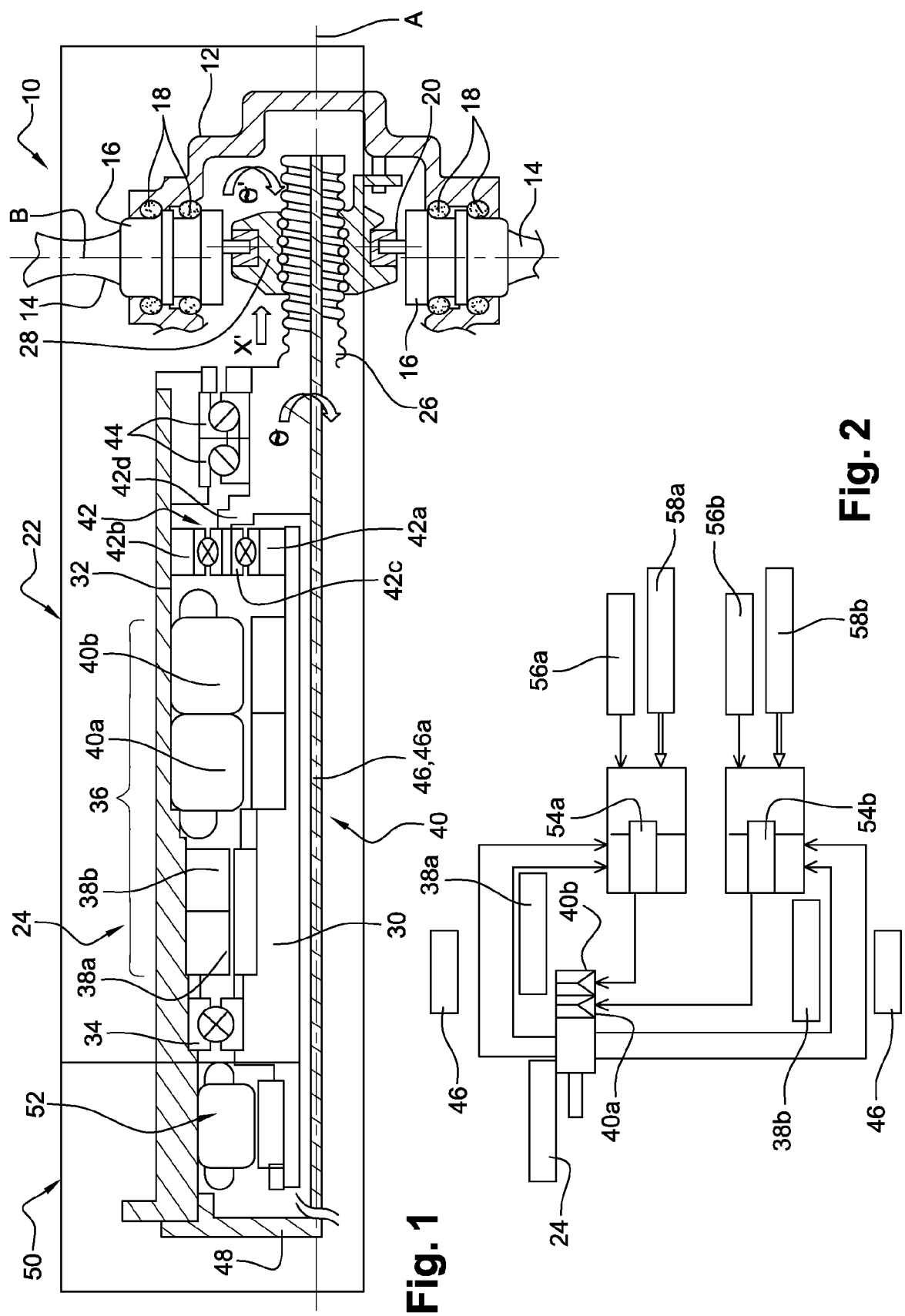

SIMPLIFIED PITCH ACTUATION SYSTEM FOR A TURBOMACHINE PROPELLER

TECHNICAL AREA

Embodiments of the disclosure relate to a pitch actuation system for a turbomachine propeller, such as a turboprop engine.

BACKGROUND

A turboprop comprises at least one propeller having a hub and blades carried by the hub and extending substantially radially outwardly relative to the hub and the axis of rotation of the propeller.

The turboprop is generally equipped with a propeller pitch actuation system, also known as the angular setting system of the propeller blades. The regulation of the setting of the propeller blades makes it possible to improve their efficiency by guaranteeing a rotational speed of the propeller for each phase of flight.

US Patent A1-2011/014046 discloses independent pitch actuation systems for two propellers.

Each blade is movable in rotation about an axis, generally radial, between a first back-up position called feathered in which it extends substantially parallel to the axis of rotation of the propeller, and a second position in which it is strongly inclined with respect to this axis. It can adopt any position between these two extreme positions.

In the present state of the art, the actuation system used is a hydraulic system, which is relatively complex and has several drawbacks. This system comprises an actuator with a movable part which is connected to the blades of the propeller for their setting.

The actuation system must not only be able to provide the pitch control function but also the blade feathering backup function. The pitch actuation system therefore comprises an auxiliary system for the back-up function.

The failure due to hydraulic leakage, a common mode between the pitch control system and the auxiliary system, must be covered. In the absence of a source of pressure, it is essential to add counterweights to the blades to ensure the feathering function.

The pitch actuation system must also provide protection functions in the event of overspeed, in the event of a stationary engine, in the event of failure of the FADEC (acronym for Full Authority Digital Engine Control) computer, and ensure the limitation of small pitches in flight. A set of mechanical systems and hydraulic systems are therefore part of the pitch actuation system to perform these functions in the current state of the art.

The pitch control system is also subject to very stringent failure rate requirements, which involve redundancies and additional protection systems.

In conclusion, the technology and the operating principle of a hydraulic system for actuating the pitch of the propeller are currently complex. A multitude of hydraulic components integrates these systems.

The present disclosure overcomes these drawbacks and provides a solution to all or part of the problems of the current technique described below.

The first problem (problem A) concerns the stringent FHA (acronym for Functional Hazard Assessment) requirements of pitch control, which involve robust architectures with redundancy.

The second problem (problem B) concerns the feathering function, which must be ensured even after a failure of the pitch control means.

The third problem (problem C) concerns the risk of blockage of the moving part of the actuator. In a hydraulic system, the rotation of a blade of the propeller is obtained by the translation of an eccentric at the root of the blade. Axial locking of the hydraulic cylinder is considered a failure.

Furthermore, in a hydraulic system, the rotation of the propeller is transmitted to the hydraulic actuator positioned in the rotating mark (piston and body without angular displacement). This cylinder is fed by pipes through a hydraulic slide positioned in the fixed mark. In this hydraulic concept, the rotation of the propeller does not cause a shift of the pitch of the propeller. The fourth problem (problem D) concerns the management of this phenomenon.

Finally, the fifth problem (problem E) relates to protection functions other than that covering the pitch control failure, which require additional mechanical and hydraulic devices in a hydraulic system of the current state of the art.

SUMMARY

The disclosure proposes a pitch actuating system for a turbomachine propeller, comprising an actuator having a movable portion configured to be connected to propeller blades for moving them in rotation relative to the pitch axes of the blades, characterized in that the actuator is an electromechanical actuator, and comprises:
  first pitch control means of the blades, which comprise at
    least one electric engine for driving a first rotor around
    a longitudinal axis, and a first transmission screw
    driven in rotation about the axis by the first rotor,
  a first nut traversed by the first transmission screw and
    configured to cooperate with the blades for their displacement,
  second means for feathering the blades, which comprise
    at least one electric engine for driving a second rotor
    about the axis, and a second fixed transmission screw,
  a second nut traversed by the second transmission screw
    and driven in rotation about the axis by the second rotor
    in order to move in translation along the axis on the
    second nut,
  and in that the system is configured so that a displacement
of the second nut in translation along the axis causes a
displacement of the first transmission screw in translation
along the axis.

The hydraulic actuator of the prior art is thus replaced by an electromechanical actuator whose movable portion comprises a transmission screw. The rotational movement of the blades is obtained by a translation of the nut on the transmission screw which is rotated by the first rotor.

In a hydraulic system, the rotation of a propeller blade is obtained by the translation of an eccentric at the root of the blade. The failure resulting from the axial locking of the hydraulic cylinder (problem C), which generates this translation, is considered extremely unlikely. This low value of the failure rate seems to be consolidated by feedback. With the system according to the disclosure, the basic system comprises a redundancy of the transmission screw.

Over-sizing of the screw is a solution to the aforementioned problem C. However, the fatigue dimensioning of the screw does not cover all the aspects related to the different cases of failure (pollution, icing, etc.). The disclosure satisfies this need satisfactorily.

Concerning the problem E, the proposed concept does not require any additional device unlike the hydraulic system, to cover the protection functions other than that covering the failure of the pitch control. In a hydraulic system, the case of an engine shutdown or loss of engine power leads to a suppression of the hydraulic power of the pump coupled to the engine; a backup system should be provided. In an electromechanical system, for these cases of failure, the electrical energy is delivered by an independent source. The feathering function therefore remains active to cover these cases of failure, preferably by way of a protective housing. In a hydraulic system, the overspeed case is covered by a mechanical counterweight system. In the electromechanical system, preferably thanks to a speed feedback, the engine control laws can act on the pitch control electric engines by way of the protective housing to ensure feathering.

Advantageously, the first means comprise two electric engines, preferably synchronous, driving the same first rotor. The choice of the technology and the strategy of the sizing of these electrical means allows to minimize the short-circuiting torque and to arrive at reasonable engine sizes. Electric redundancy of the electric engines allows to respect the FHA reliability requirements (problem A). To preserve a simple architecture, it is proposed here to make the rotors of electric engines common. This makes it possible to keep only one transmission chain and to have a relatively compact system. The proposed concept offers this advantage.

The proposed system is preferably able to provide the reliability required by electrical redundancy, both as to the electrical components and as to the control and independent power circuits controlled by a computer. This system is then able to ensure its pitch control function even in the event of a short circuit in the power supply.

This electromechanical concept may require no mechanical energy from the turbomachine. The cases of failure from loss of engine power and engine shutdown can therefore be provided by way of a protective housing by the nominal electromechanical system without any additional device. This electromechanical concept also allows to cover the overspeed case and the failure of the FADEC without any additional device.

The system according to the disclosure may comprise one or more of the following characteristics, taken separately from each other or in combination with each other:
  the first rotor is connected to the first transmission screw by a first reduction gear, for example a planetary reduction gear,
  the second nut is connected to the second rotor by a second reduction gear, for example a planetary reduction gear,
  a planet carrier of the or of each reduction gear is guided in rotation by a pair of inverted angular contact bearings,
  the first means comprise at least two resolvers,
  the electric engine of the second means is an asynchronous engine; the choice of this type of electric engine for feathering allows to reduce the control box and to eliminate any resistive torque linked to a short-circuiting (problem B),
  the electric engines comprise stators carried by a first casing which is slidably mounted in translation along the axis in a second fixed casing,
  the first rotor and/or the transmission screw are guided in rotation by at least one bearing in a casing, preferably a stator; in the latter case, the second casing of the actuator is fixed while the nut mounted on the transmission screw is rotatably connected to the propeller; to prevent this rotation of the nut from causing a translation thereof on the transmission screw and therefore a variation of the pitch of the blades, it is necessary that the transmission screw be kept rotating continuously and therefore the electric engines running continuously; the maintenance of the pitch therefore requires continuous rotation of the rotors of the engines; the control of the pitch is managed by the differences in rotational speeds between the propeller and the electric engines (which thus brings a solution to the aforementioned problem D), and
  the two electric engines of the first means are respectively connected to two electronic control boxes which are each configured to be active when the other is passive, and vice versa.

The present disclosure also relates to a turbomachine, such as a turboprop, comprising a propeller whose blades have a variable pitch and a system as described above, wherein the first nut cooperates with eccentrics provided on plates for supporting and rotating the blades.

The present disclosure finally relates to a method for actuating the blade pitch of a turbomachine propeller by means of a system as described above, comprising the steps of:
  keeping the pitch of the blades by synchronizing the speed of the first electrical means with the speed of the propeller, so that the first rotor and the propeller rotate at the same angular speed, and
  changing the pitch of the blades by desynchronizing the speed of the first electric means of the propeller speed, so that the first rotor rotates at an angular speed different from that of the propeller.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIG. 1 is a partial schematic half-view in axial section of a blade pitch actuating system associated with a turbomachine propeller;

FIG. 2 is a block diagram showing the general architecture of the actuating system and the electrical control means of the system of FIG. 1;

DETAILED DESCRIPTION

Figure 3:
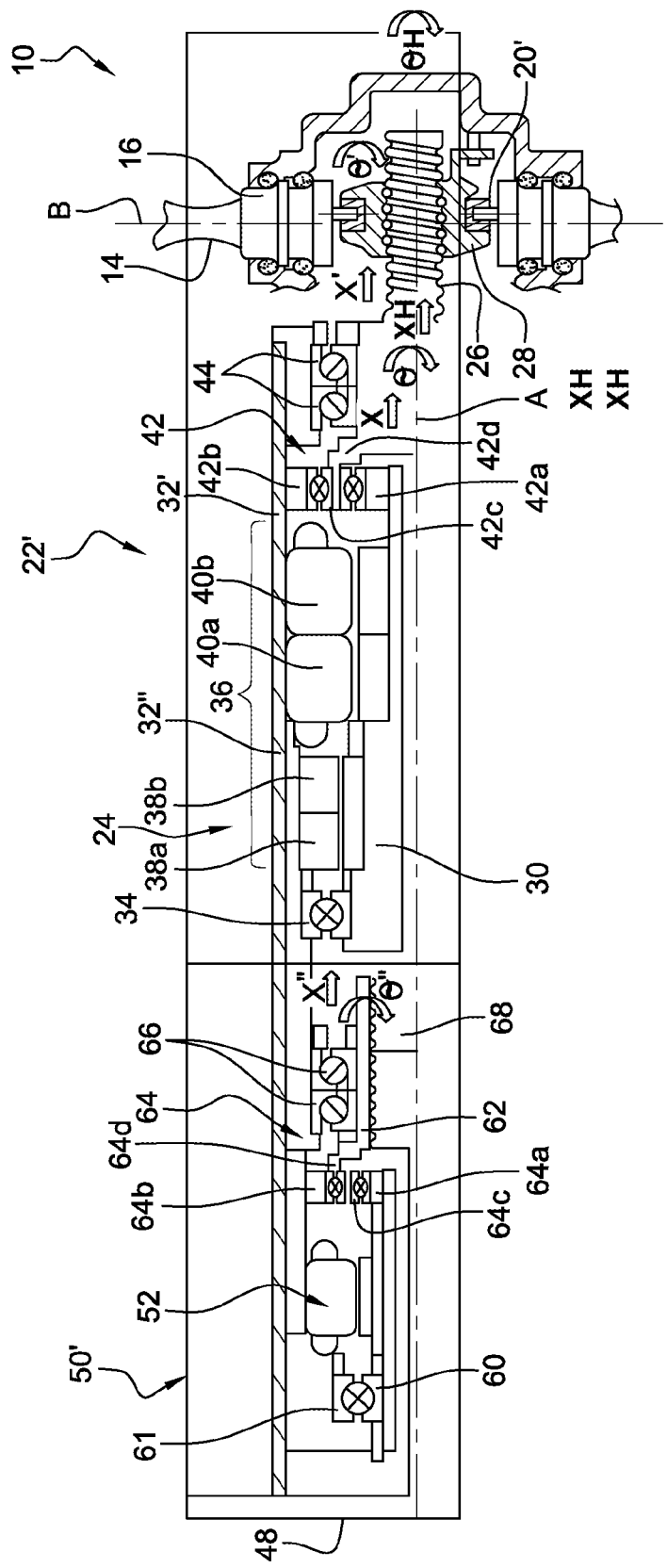
FIG. 3 is a partial schematic half-view in axial section of a blade pitch actuation system according to the disclosure associated with a turbomachine propeller.

The detailed description set forth below in connection with the appended drawings, where like numerals reference like elements, is intended as a description of various embodiments of the disclosed subject matter.

We first refer to FIG. 1.

A propeller 10 of a turbomachine, and in particular a turboprop, is generally unsheathed and comprises a movable hub 12 (arrow θ' of FIG. 1) with axis A of rotation, the hub carrying blades 14 which extend substantially radially relative to the axis A. Each blade 14 is connected at its radially inner end to a substantially cylindrical plate 16 for supporting and guiding the blade in rotation in order to set its rotation about an axis B, in this case substantially radial. The plate 16 of each blade 14 is mounted in a housing of the hub 12 and is centered and guided in this housing by bearings 18 extending around the axis B. The radially inner end of each blade comprises an eccentric 20. The latter is integrally connected to the plate 16 and an actuating system 22 can move it in rotation about the axis B. The displacement of the eccentrics 20 causes a rotational movement of the plates 16 and therefore the blades 14 about the axes B. Each blade 14 can be set at a given pitch or in a given position about its axis B, between two extreme positions, one of which, called feathered, corresponds to the case where the chord of the cross section of the blade extends substantially parallel to the axis A.

In the prior art, the actuation system was hydraulic, and had many disadvantages. FIG. 1 shows an electromechanical actuation system.

The actuating system 22 of FIG. 1 comprises an electromechanical actuator 24 whose movable portion comprises a transmission screw 26 which is associated with a nut 28 guided in translation relative to the hub 12 and configured to cooperate with the eccentrics 20 of the blades 14 for their rotation in relation to the B axis.

The nut 28 comprises housings intended to receive the eccentrics 20 and to drive them during the displacements of the nut 28. Each housing receives, for example, an eccentric finger 20 of the corresponding blade 14, each finger being disposed in a protruding position into the housing. The nut is thus integral with the blades while in movement, and therefore to the propeller when the latter is rotated relative to the axis A. The nut 28 is thus arranged to be rotatable relative to the axis A in a fixed reference.

The transmission screw 26 extends along the axis A and is rotatable relative to the axis A. It passes through the nut 28 and therefore comprises a thread complementary to that of the nut. The nut 28 is thus also arranged to be movable in translation relative to the axis A in the same fixed reference. The transmission screw 26 advantageously has a reversibility function in that it is able to be subjected by the actuator to a torque so as to cooperate with the nut and move it, and also to be subjected by the nut to axial forces causing a rotation of the transmission screw. On this point, it differs from an endless screw which has a function of irreversibility.

It will be understood that the rotation of the transmission screw 26 (arrow θ of FIG. 1) causes a displacement in translation of the nut 28 along the axis A. The rotation of the transmission screw 26 therefore causes a translation of the nut 28, which in turn causes a displacement of the eccentrics 20 and a rotation of the blades 14 relative to the axis B. The arrow X' represents the axial displacement of the nut along the axis A and the arrow θ' represents the rotation of a blade 14 around a B axis.

The transmission screw 26 is driven by a rotor 30 of the actuator 24 which is centered and guided by bearings in a casing 32, of a stator in the example shown. The casing 32 is thus fixed. It has a generally cylindrical elongated shape with an axis A.

The rotor 30 has an elongated shape with an axis A and is here guided in the casing 32 by at least one bearing 34. The bearing 34, here a rolling bearing and more specifically a ball bearing, is mounted at the axial end of the actuator, opposite to the propeller (left end on the drawing).

The actuator 24 comprises first electric means 36 for controlling the pitch of the blades. In the example shown, these electrical means 36 comprise two resolvers 38a, 38b and two electric engines 40a, 40b, which are here synchronous machines. The resolvers 38a, 38b are arranged next to one another and have the axis A as their common axis. The electric engines 40a, 40b are arranged next to one another and also have the axis A as their common axis. The resolvers 38a, 38b are here arranged between the bearing 34 and the electric engines 40a, 40b.

Each resolver 38a, 38b comprises a resolver rotor mounted on the common rotor 30, and a resolver stator integral with the casing 32. The rotors and resolver stators are generally composed of windings. In a known manner, a resolver allows to obtain an electrical value from a change of angle of a rotor. A resolver operates as a transformer whose coupling varies with the mechanical angle of the rotor. When the rotor winding is excited with an AC voltage, an AC voltage is recovered on the stator winding. The redundancy associated with the use of two resolvers 38a, 38b instead of one, makes it possible to guarantee the reliability requirements mentioned above.

Each electric engine 40a, 40b is here of the synchronous machine type and comprises a rotor mounted on the common rotor 30, and a stator secured to the casing 32. The rotor may consist of permanent magnets or consist of a winding supplied with direct current and a magnetic circuit (electromagnet). To produce current, an external force is used to turn the rotor: its magnetic field, when rotating, induces an alternating electric current in the stator windings. The speed of this rotating field is called "synchronism speed". The synchronism speed is directly related to the frequency of the power supply. Here, the engines are powered by a three-phase current system.

As seen in the drawing, the transmission screw 26 is driven by the common rotor 30 by means of a reduction gear 42, which is here a planetary reduction gear or epicyclic reduction gear. This reduction gear 42 comprises a sun shaft 42a rotatably connected to the common rotor 30, an outer ring gear 42b surrounding the sun shaft and secured to the casing 32, planet gears 42c meshing with the sun shaft 42a and the outer ring gear 42b and carried by a planetary carrier 42d which is here integral in rotation with the transmission screw 26. In the example shown, the transmission screw 26 and the planetary carrier 42d are formed in one piece.

The piece comprising the planetary carrier 42d and the transmission screw 26 is centered and guided in the casing 32 by a pair of rolling bearings, here ball bearings. These bearings 44 are the angular contact type. They are inverted and mounted next to each other at the axial end of the actuator located on the propeller 10 side (right end in the drawing).

The actuation system 22 further comprises at least one sensor 46 of the LVDT type (acronym for Linear Variable Differential Transformer). In the example shown, the transmission screw 26 comprises an internal axial bore in which is slidably engaged a LVDT ferromagnetic plunger 46a carried by a rear cover 48 of the actuator 22, which is itself fixed to the stator casing 32. Although this is not shown, the plunger 46a is surrounded by several windings carried by the transmission screw 26, including at least one primary winding supplied by an alternating current and two secondary windings. These windings are preferably redundant to increase the reliability of the system. The axial displacement of the plunger 46a inside the windings, channels the flow and generates voltages in the secondary windings whose amplitudes depend on the position thereof. The sensor 46 thus provides a voltage proportional to the displacement of the plunger 46a.

The turboprop is equipped with an auxiliary system for feathering the blades 14, which is here electromechanical. The system 50 is integrated with the actuator 22 and comprises an electric engine 52, which is preferably an asynchronous machine (in order not to generate a resistive torque), whose stator is integral with the casing 32 and whose rotor is integral with the common housing 30. In the example shown, it is mounted between the rear cover 48 and the bearing 34.

The use of an electromechanical system for feathering offers the following advantages: the control box is simple and of high reliability; the case of short-circuiting does not need to be covered, it is not necessary to oversize synchronous machines to cover this case of failure; in the absence of short-circuiting induced by this engine, the rotor can be mounted directly on the rotor axis of the synchronous machines and benefit from the reduction ratio of the gears. It is not necessary to add reduction gears.

Reference is now made to FIG. 2, which schematically represents the basic electrical diagram of the operation of the system of FIG. 1.

The elements described above are designated by the same reference numbers in FIG. 2.

FIG. 2 shows in particular the control means of the electrical machines of the system, namely, in the case where the redundancy applies to all these machines, two LVDT sensors 46, two resolvers 38*a*, 38*b*, and two electric engines 40*a*, 40*b*.

The control means include two segregated electronic control boxes 54*a*, 54*b* which are each connected to a resolver, a sensor and an electric engine, and which have the ability to drive these machines independently.

The boxes 54*a*, 54*b* operate in "passive-active" mode. In nominal mode, the pitch is controlled by the control box 54*a*, for example, and the control box 54*b* is in passive mode. In the event of a failure detected by a position error, for example, the box 54*a* is deactivated and the box 54*b* is activated. The boxes 54*a*, 54*b* have three nested local control loops: a torque loop using the phase current measurements, a speed loop using the resolver, and a linear position loop using the LVDT sensor. The boxes 54*a*, 54*b* receive the position instruction respectively from computer housings 56*a*, 56*b* and are associated with electrical networks 58*a*, 58, to send a current request to the engines 40*a*, 40*b*.

Although this is not shown in FIG. 2, the control means further comprise an independent power supply device for the electric engine 52.

This concept of electromechanical type for the pitch actuation system is very innovative because it offers the following advantages:
- simple and robust architecture with a minimum of electromechanical components in accordance with stringent reliability criteria,
- elimination of the case of hydraulic leakage failure, which required the addition of counterweights for feathering,
- elimination of the counterweights of the prior art for the feathering of the blades,
- elimination of any additional devices to cover cases of failures other than those related to the failure of the pitch control.

In the system described above, the casing 32 is fixed and the assembly formed by the transmission screw 26 and the nut 28 is allowing three degrees of freedom: in a fixed reference, the nut 28 has two degrees of freedom (in translation and in rotation with respect to the axis A—respectively arrows X' and θ') and the transmission screw 26 has only one degree of freedom (in rotation about the axis A—arrow θ). To prevent the nut 28 from moving in translation on the transmission screw 26 (which would generate a change in the pitch of the blades), the latter must rotate at the same angular speed as the propeller (θ'=θ). To maintain the pitch of the blades, it is necessary to synchronize the engine speed 40*a*, 40*b* with the propeller speed 10. On the contrary, to vary the pitch of the blades, it is necessary to desynchronize the speed of the electric engines of the propeller speed.

We are referring now to FIG. 3 which shows an embodiment of the disclosure, wherein the pitch actuating system 22' has a redundancy of the transmission screw.

The architecture comprises two transmission chains. Each of them has a transmission screw, both active during the function of the pitch control or during the feathering function. Here, these two transmission screws have totally different modes of operation. This asymmetrical combination was designed to allow activation of the feathering function if one of the two screws is blocked. Each transmission chain has a reduction gear unit and one or two electrical machines. Angular contact bearings are mounted upstream and downstream of the assembly to ensure their translation under the application of an axial force. The body of these two electrical assemblies can move axially in a fixed body provided with anti-rotation means. Only one electrical set is active, the other being passive. In case of blocking of one of the transmission screws, the feathering requires a changeover, the active electrical assembly having to be disabled and the passive electrical assembly having to be activated, as described above.

More specifically, the system 22' of FIG. 3 includes all the features of the system 22 of FIG. 1 except for those which are in contradiction with the following.

In the system 22', casing 32', which surrounds the bearing 34, the first electrical means 36, the reduction gear 42 and the bearings 44, is no longer fixed but instead is movable in translation along the axis A. Thus, the assembly formed by the transmission screw 26 and the nut 28 is allowing four degrees of freedom (against three previously): in a fixed reference, the nut 28 has two degrees of freedom (in translation and rotation with respect to the axis A—arrows X' and θ' respectively), and the transmission screw 26 also has two degrees of freedom (in translation and in rotation with respect to the axis A—respectively arrows X and θ).

The casing 32' is slidably mounted axially in a stator casing 32", that is to say fixed, for example by means of a sliding device. The casing 32' is prevented from rotating with respect to the casing 32" by anti-rotation means.

The casing 32' comprises an axial extension on the opposite side to the propeller 10, on which is fixed the stator of the electric engine 52 of the feathering means 50'. The rotor of the electric engine 52 is mounted on a shaft 60 which is independent of the rotor 30. The shaft 60 is guided in rotation about the axis A by means of a rolling bearing 61, here a ball bearing, mounted between the shaft 60 and the casing 32', and rotates a nut 62 through a reduction gear 64, which is here also a planetary reduction gear.

This reduction gear 64 comprises a sun shaft 64*a* rotatably secured to the shaft 60, an outer ring gear 64*b* surrounding the sun shaft and secured to the casing 32', and planet gears 64*c* meshing with the sun shaft 64*a* and the outer ring gear 64*b* and carried by a planet carrier 64*d* which is here integral in rotation with the nut 62. In the example shown, the nut 62 and the planet carrier 64*d* are formed in one piece.

The piece comprising the planet carrier 64*d* and the nut 62 is centered and guided in the casing 32' by a pair of rolling bearings 66, here ball bearings. These bearings 66 are the angular contact type. They are inverted and mounted next to each other between the reduction gear 64 and the bearing 34.

The nut 62 is traversed by a transmission screw 68 which is fixed. In the example shown, the screw 68 is located at a longitudinal end of a cylindrical body which extends along the axis A inside the shaft, and whose opposite end is secured to the cover 48. As in the previous case, the cover 48 is fixed to the stator casing 32" and may carry a ferromagnetic plunger of one or two LVDT sensors.

The nut 62 cooperates with the transmission screw 68. Because of the fixed nature of the transmission screw 68, a rotation of the nut 62 about the axis A causes a displacement in translation of the nut on the screw along the axis A. Thus, the assembly formed by the transmission screw 68 and the nut 62 is allowing two degrees of freedom: the nut 62 has two degrees of freedom (in translation and rotation relative to the axis A—arrows X" and θ" respectively), and the transmission screw 68 does not have any.

In general, it is understood that a rotation of the nut 62 causes an axial displacement of the nut 62 which, through the bearings 66, will cause an axial displacement of the casing 32' which itself, through the bearings 44, causes an axial displacement of the transmission screw 26. The shaft 60 and the rotor 30 (as well as the screw 26) move simultaneously in translation with the nut 62 and casing 32".

FIGS. 4a to 7b allow to explain in more detail the various operating cases of the system 22' according to the disclosure. FIGS. 4a, 5a, 6a and 7a illustrate what happens at the two-degree of freedom assembly including the transmission screw 68 and the nut 62, and FIGS. 4b, 5b, 6b and 7b illustrate what happens at the four-degree of freedom assembly including the transmission screw 26 and the nut 28.

Figure 4A:
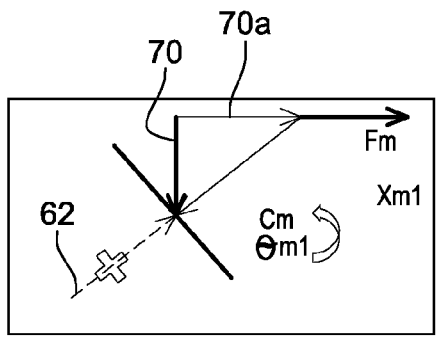
FIGS. 4a to 7b are diagrams illustrating the operation of the system of FIG. 3, in several distinct cases.
Figure 4B:
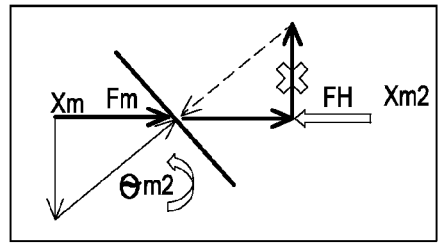

FIGS. 4a and 4b illustrate a first case in which the blades must be feathered when the transmission screw 26 is operational (not blocked).

In FIG. 4a, the arrow in dashed lines surmounted by a cross represents the fixed transmission screw 68. The arrow 70 represents the torque Cm applied by the electric engine 52 to the nut 62. This torque Cm is decomposed into an axial component 70a and a radial component 70b. The radial component will be taken up by the transmission screw 68 and this will result in an axial force Fm which will generate a rotation θm1 of the nut 62 and therefore a translation Xm1 thereof on the screw 68. Xm1=θm1*2π.

The force Fm and the translation Xm1 are found in FIG. 4b, the force being applied to the transmission screw 26. This force is decomposed into a radial component and a normal component, the latter being taken up by the nut 28. The force Xm1 will generate a rotation θm2 of the screw 26. An external axial force FH is applied to the propeller and therefore to the nut 28, which is decomposed into an axial component and a radial component.

Thus, if the axial component of the torque Cm developed by the feathering means on the fixed reference side is greater than the external axial force, it will result in an axial displacement Xm1 of the two sets of electrical machines. The resulting effort will pass through the four angular contact bearings 44, 66. Under the resultant force, the nut 62 will be subjected to a rotation θm1. Thus, under the resultant force, the nut 28 and screw 26 assembly will undergo this translation. The force developed by the feathering means will cause a rotation θm2 of the screw 26. The rotation of the propeller θH transmitted to the nut 28 will cause an axial displacement of the nut on the propeller side. The difference in rotation between the propeller θH and the screw θm2 will cause a resulting axial displacement Xm2 (Xm2=(θH−θm2)*2π). The axial displacement of the eccentrics of the blades will therefore be the resultant between the displacement Xm1 derived from the resultant of the axial forces and the displacement Xm2 derived from the difference in rotation between the propeller and the screw 26 driven in rotation by the force developed by the feathering means.

Figure 5A:
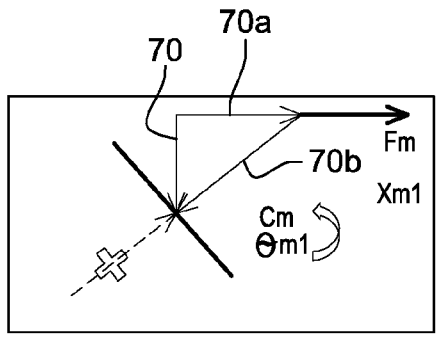
Figure 5B:
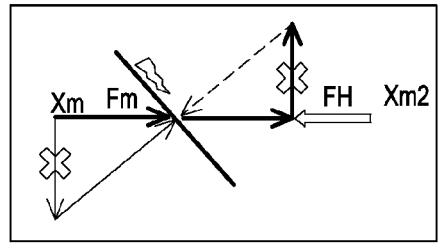

FIGS. 5a and 5b illustrate a second case in which the blades must be feathered when the transmission screw 26 is blocked.

FIG. 5a is similar to FIG. 4a. In FIG. 5b, the force Xm1 will not cause a rotation of the screw 26 because the latter is blocked.

Thus, in the event of blocking of the screw 26 on the propeller side, the feathering function can be ensured by activating the feathering means. If the screw 26 is blocked, the rotation of the propeller 10 will be transmitted not only to the nut 28 but also to the screw 26. The torque Cm developed by the feathering means will have an axial component which will be transmitted on the propeller side through four angular contact bearings 44, 66. If this axial component is greater than the axial external force FH, it will cause an axial displacement XH of the assembly of the screw 26 subjected to the rotation of the propeller (XH=θm1*2π). This resulting displacement will cause a rotation θm1 of the nut 62.

Figure 6A:
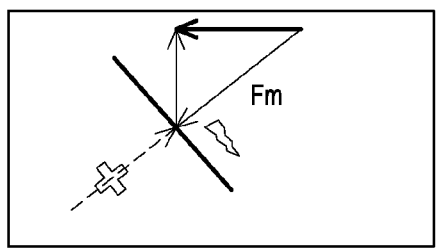
Figure 6B:
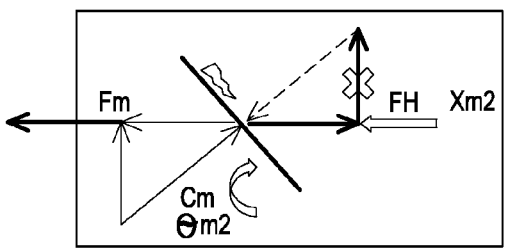

FIGS. 6a and 6b illustrate a third case in which the pitch of the blades must be controlled when the nut 62 is blocked.

If one considers the case of the blocking of the nut 62, the feathering function can be ensured by the activation of one of the two engines 40a, 40b. If the nut 62 is blocked, the translation of the casing 32' is not possible either. The torque Cm developed by the engines 40a, 40b on the propeller side has an axial component. If this axial component is greater than the external force FH, this will result in an axial displacement of the nut 28 connected to the resultant and a rotation θm2. The torque Cm developed by the engines will also cause a rotation of the screw 26. The difference in rotation between the propeller θH and the screw θm2 will cause a resulting axial displacement XH (XH=(θH−θm2)*2π).

Figure 7A:
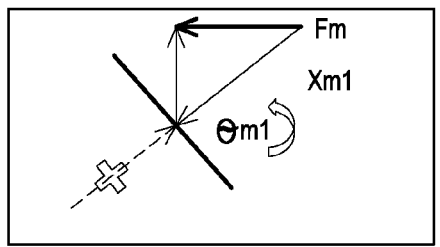
Figure 7B:
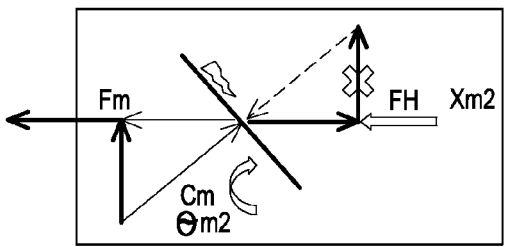

FIGS. 7a and 7b illustrate a fourth case in which the pitch of the blades must be controlled when the transmission screw 68 is operational (not blocked).

If the axial component of the torque Cm developed by the electric engines 40a, 40b on the nut 28 of the transmission screw 26 is greater than the external axial force FH, this will result in an axial displacement Xm1 of the two sets of electrical machines (Xm1=θm1*2π). The resulting force will pass through the four angular contact bearings 44, 66. Under the resultant force, the nut 62 will move in translation and in rotation. Under the resultant force, the nut 28 and screw 26 assembly will thus undergo this translation xm1. The torque developed by the engines will cause a rotation θm2 of the screw 26. The rotation of the propeller θH transmitted to the nut 28 will cause an axial displacement of the nut 28. The difference in rotation between the propeller and the engine will cause a resulting axial displacement Xm2 (Xm2=(θH−θm2)*2π). The axial displacement of the eccentric at the root of the blades will therefore be the resultant between the displacement Xm1 derived from the resultant axial forces and the displacement Xm2 derived from the difference in rotation between the propeller and the screw 26 driven by the engines 40a, 40b (only one of the engines is active at the same time).

In the embodiment described above, each transmission chain is dedicated to a function; one ensures that of feathering and the other that of the pitch control.

In an alternative embodiment of the disclosure, not shown, each transmission chain is capable of providing both the feathering function and the pitch control function. Each transmission chain will include a machine dedicated to pitch control and a machine dedicated to feathering. This architecture will include four machines in all, so an additional machine compared to the previous case. This option is offered for the following advantages:

in the event of a short-circuiting of the pitch control machine, the machine which controls the pitch of the other transmission chain will be activated; no over-sizing of the machines is therefore required to overcome the resistive torque generated by the short-circuiting of the pitch control machine;

in the event of a short-circuiting of the feathering machine, the feathering machine of the other transmission chain will be activated; no over-sizing of the machines to cover this case of short-circuiting is required because the technological choice of the feathering machine allows to eliminate the resistive torque in case of short-circuiting.

Thanks to this option, the size of the engines will be greatly reduced and the reliability increased with, however, the disadvantage of an additional engine. Only a pre-design study will allow to quantify the advantage in terms of mass and the disadvantage in terms of cost. This electromechanical concept also offers the considerable advantage that: if one of the two angular contact bearings is jammed on one of the two transmission chains, the other transmission chain has the ability to ensure feathering.

This electromechanical concept thanks to the natural redundancy of the transmission screw offers considerable reliability and robustness. To keep a simple architecture, it is essential to be able to propose an architecture that does not include an additional electrical device to release the blocked screw. This electromechanical concept without additional electrical device avoids adding another source of failure in the system and also avoids adding dormant failures. This electromechanical concept has been studied in principle to cover all cases of failure.

The principles, representative embodiments, and modes of operation of the present disclosure have been described in the foregoing description.

The invention claimed is:

1. A pitch actuating system for a turbomachine propeller, comprising an actuator having a movable portion configured to be connected to propeller blades for moving them in rotation relative to pitch axes of the blades, wherein the actuator is an electromechanical actuator, and comprises:

first pitch control means of the blades, which comprise at least one electric engine for driving a first rotor around a longitudinal axis, and a first transmission screw driven in rotation about the longitudinal axis by said first rotor;

a first nut traversed by said first transmission screw and configured to cooperate with the blades for their displacement;

second means for feathering the blades, which comprise at least one electric engine for driving a second rotor about the longitudinal axis, and a second fixed transmission screw;

a second nut traversed by said second transmission screw and driven in rotation about the longitudinal axis by said second rotor in order to move in translation along the longitudinal axis on said second nut, and wherein the system is configured so that a displacement of the second nut in translation along the longitudinal axis causes a displacement of the first transmission screw in translation along the longitudinal axis.

2. The system according to claim 1, wherein said first pitch control means comprise two electric engines for driving the first rotor.

3. The system according to claim 1, wherein said first rotor is connected to the first transmission screw by a first reduction gear.

4. The system according to claim 1, wherein said second nut is connected to said second rotor by a second reduction gear.

5. The system according to claim 3, wherein a planet carrier of the first reduction gear is guided in rotation by a pair of inverted angular contact bearings.

6. The system according to claim 1, wherein said first pitch control means comprise at least two resolvers.

7. The system according to claim 1, wherein the electric engine of said second means is an asynchronous engine.

8. The system according to claim 1, wherein said electric engines comprise stators carried by a first casing which is slidably mounted in translation along the longitudinal axis in a second fixed casing.

9. A turbomachine comprising a propeller whose blades have a variable pitch and a system according to claim 1, wherein the first nut cooperates with eccentrics provided on plates for supporting and rotating the blades.

10. A pitch actuation method of the blades of a turbomachine propeller, by means of a system according to claim 1, comprising the steps of:

maintaining the pitch of the blades by synchronizing the speed of the first pitch control means with the speed of the propeller, so that said first rotor and the propeller rotate at the same angular speed, and changing the pitch of the blades by desynchronizing the speed of the first pitch control means with the speed of the propeller, so that said first rotor rotates at an angular speed different from that of the propeller.

* * * * *